(12) United States Patent
Nagase (10) Patent No.: US 8,199,391 B2
(45) Date of Patent: Jun. 12, 2012

(54) OPTICAL SCANNING APPARATUS HAVING AN AIR PATH FOR AIRFLOW GENERATED BY A ROTATING MIRROR

(75) Inventor: Tetsuya Nagase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/466,179

(22) Filed: Aug. 22, 2006

(65) Prior Publication Data

US 2007/0058235 A1 Mar. 15, 2007

(30) Foreign Application Priority Data

Sep. 13, 2005 (JP) ................................ 2005-265528

(51) Int. Cl.
*G02B 26/08* (2006.01)
(52) U.S. Cl. .................................................... 359/216.1
(58) Field of Classification Search ........... 359/216–219
See application file for complete search history.

(56) References Cited

U.S. PATENT DOCUMENTS

| 5,046,797 A * | 9/1991 | Kurisu et al. ................. 359/217 |
| 5,675,200 A * | 10/1997 | Hayashi ........................... 310/90 |
| 5,821,647 A * | 10/1998 | Takehara et al. ............. 310/67 R |
| 5,838,001 A * | 11/1998 | Minakuchi et al. ........... 250/236 |
| 6,172,786 B1 * | 1/2001 | Fujita et al. .................... 359/200 |
| 6,285,482 B1 | 9/2001 | Date |
| 6,813,052 B2 * | 11/2004 | Yoshizawa ..................... 359/216 |
| 2006/0285188 A1 * | 12/2006 | Tahk .............................. 359/216 |

FOREIGN PATENT DOCUMENTS

| CN | 1881005 A | 12/2006 |
| JP | 59048728 A * | 3/1984 |
| JP | 06051228 A * | 2/1994 |
| JP | 09080347 A * | 3/1997 |
| JP | 11-072739 A | 3/1999 |
| JP | 11264949 A * | 9/1999 |
| JP | 2000-330055 A | 11/2000 |

* cited by examiner

*Primary Examiner* — Jennifer L. Doak
(74) *Attorney, Agent, or Firm* — Canon U.S.A., Inc. IP Division (57) ABSTRACT

At least one exemplary embodiment is directed to a first airflow guide device covering an upper portion of a polygon mirror and having respective opening portions in an upper surface and a lower surface. The lower surface opening portion can have an annular wall opened in the direction all around the perimeter of the polygon mirror, facilitating an airflow path capable of circulating an airflow between the upper surface opening portion and the lower surface opening portion. Thus, airflow generated in a vertical direction in association with the rotation of the polygon motor, is guided, and variations in pressure applied to the polygon motor are reduced, thus facilitating an increase in the rotation accuracy of the polygon motor.

16 Claims, 9 Drawing Sheets

OPTICAL SCANNING APPARATUS HAVING AN AIR PATH FOR AIRFLOW GENERATED BY A ROTATING MIRROR

BACKGROUND OF THE INVENTION

1. Field of the Invention

The present invention relates to an optical scanning apparatus.

2. Description of the Related Art

In an image forming apparatus adopting electrophotography, a light beam of a laser has previously been allowed to deflection-scan (e.g., by using a polygon mirror rotating at a high speed), and been applied to a photosensitive body. That is, a latent image is formed on a photosensitive body, the surface of which is uniformly electrified with a charger, by light irradiation in accordance with the image information. Subsequently, the resulting latent image is developed with a developer, and the developed image is transferred to a recording material, so that an image is formed.

The polygon mirror in the above-described image forming apparatus is coaxially attached to a rotating shaft of a brushless motor to constitute a polygon motor, and is disposed in a light beam scanning apparatus of the image forming apparatus, so as to be driven to rotate at a high speed of 20,000 rpm to 50,000 rpm.

However, when this polygon motor is rotated at a high speed, airflow is generated, and a noise problem occurs. In order to overcome this problem, previously, the polygon motor has been hermetically sealed and leakage of the sound to the outside of the apparatus has been reduced. For example, as described in Japanese Patent Laid-Open No. 2000-330055, a polygon motor is disposed in a hermetically sealed space partitioned by a lid, and case.

Figure 10A:
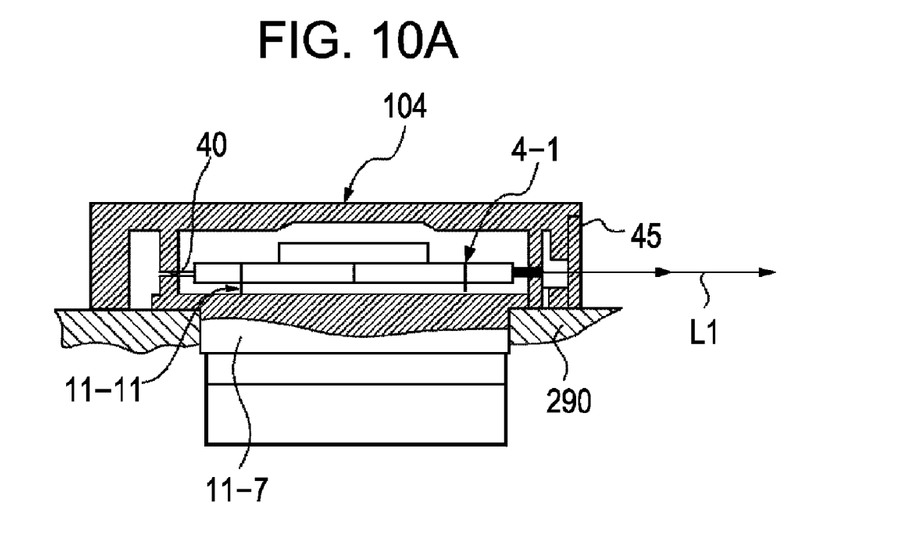
FIGS. 10A and 10B are schematic diagrams of a polygon motor portion in a known example.
Figure 10B:
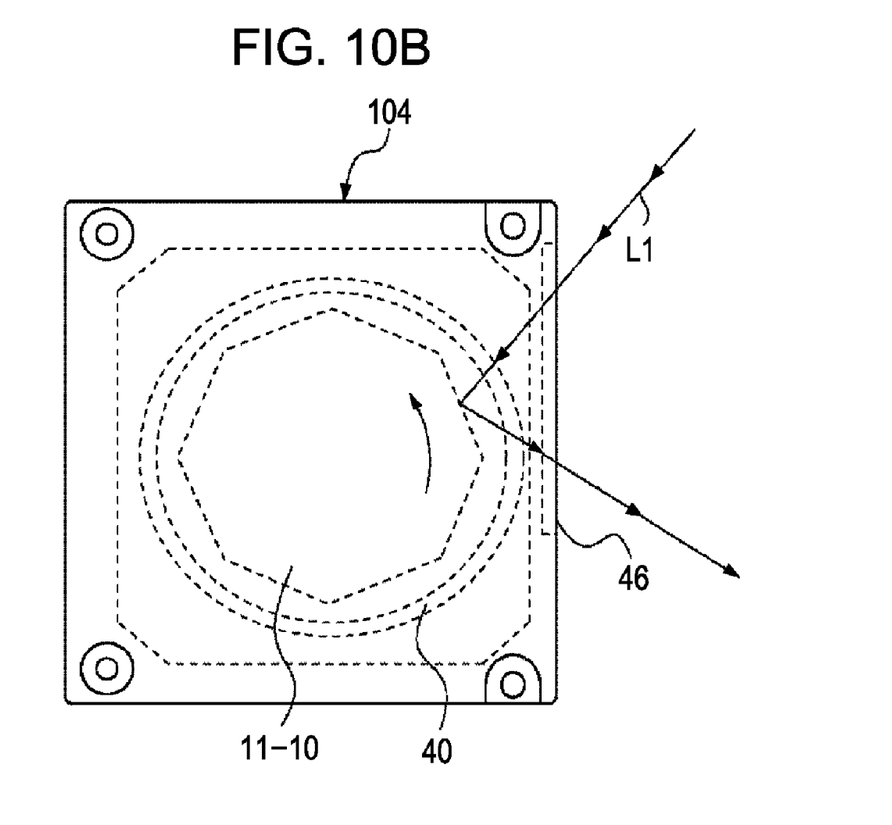

Even when the space is hermetically sealed, wind noise of the polygon mirror occurs. A configuration to reduce this is described in Japanese Patent No. 3472142. As is indicated by a schematic diagram shown in FIGS. 10A-B, the polygon motor 11-7 is hermetically sealed, and an annular slit 40 open in the direction all around the perimeter of the polygon mirror 11-10 and extending in an outward direction of the polygon mirror is disposed in a cover component provided with an cylindrical portion 104 covering the outer perimeter of the polygon mirror. In this manner, the airflow in the rotating surface direction in the cover is made uniform in the circumferential direction, and the noise is reduced effectively.

However, according to the above-described document, even when the cover is disposed, the air pressure cannot be made uniform due to an airflow generated in the rotation axis direction of the polygon motor (hereafter referred to as a vertical direction).

Since the polygon mirror is rotated, an airflow, which flows outward in a polygon mirror radius direction, is generated partly on a polygon mirror upper surface portion due to the viscosity of air, and the polygon mirror upper surface becomes at a negative pressure. Likewise, for a motor rotor, an airflow is generated in the vertical direction depending on the shape and, thereby, a pressure gradient is generated. As a whole, these flows are synthesized, and a large airflow is generated in the rotation axis direction of the polygon motor. In particular, if the polygon mirror upper surface portion or lower surface portion develops a negative relative pressure (with respect to the middle rotation surface) and a pressure gradient is generated, variations in the pressure applied to the reflection surface of rotating noncircular polygon mirror becomes larger in the rotation direction, and a problem may occur in that the rotational variation of the polygon mirror under high accuracy rotation control is deteriorated. If the rotational variation of the polygon mirror occurs, the length of scanning on the photosensitive drum is varied, and a poor image may result, in which distortion occurs particularly in an image on the scanning end side, or a poor image, e.g., color misalignment, may result in a full color printer which produce an image by superimposing images of a plurality of colors.

In recent years, the diameter of a polygon mirror has been decreased by adopting a semiconductor laser having multiple emission points as a light source and decreasing the number of reflection surfaces. Consequently, the power required for driving the polygon mirror to rotate can be reduced on the basis of reduction of the rotational inertia, the start-up time can be reduced, and light beam scanning apparatus can be miniaturized. On the other hand, since the rotational inertia is reduced by the decrease of the diameter of the polygon mirror, the above-described rotational variation tends to become particularly significant.

Figure 11:
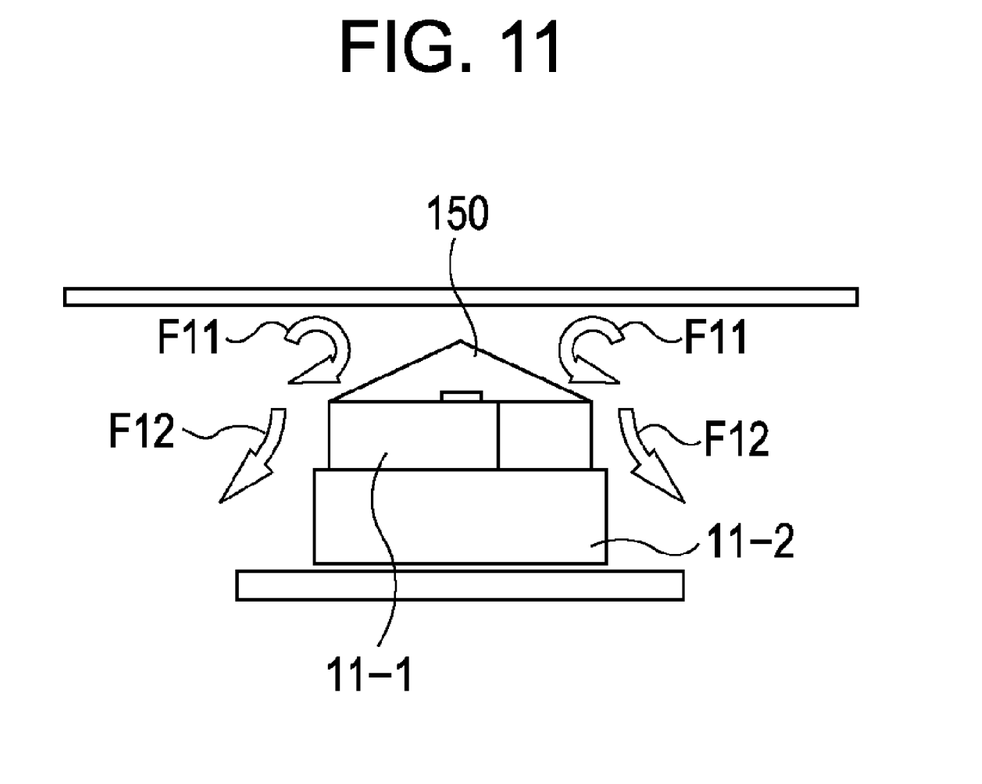
FIG. 11 is a diagram showing the analytical result of the airflows generated relative to a polygon motor in a known example.

FIG. 11 is a sectional view of a polygon motor disposed in a hermetically sealed space partitioned by a lid component and a case, as described in Japanese Patent No. 3472142. Arrows (F11, F12) shown around the polygon motor indicate the result of flow analysis of the airflows generated during the rotation of the polygon motor 11-2. Particularly, in a configuration in which a circumscribed circle diameter of the polygon mirror 11-1 is smaller than the motor rotor diameter, as shown in FIG. 11, the air flows downward from above the entire polygon mirror, as indicated by arrows F12. In particular, above the polygon mirror upper surface portion, spiral flows as indicated by arrows F11 are generated and the inflow of air is restricted, so that a negative pressure portion 150 is generated, the flow indicated by arrows F12 exerts a synergistic effect, and a significant pressure gradient is generated in the vertical direction. Consequently, the pressure gradient in the vertical direction becomes further significant, and the negative pressure generated at the polygon mirror upper surface may exceed 100 Pa.

Therefore, it is desired that the pressure gradient in the vertical direction is minimized in the rotation axis direction of the rotating polygon mirror.

SUMMARY OF THE INVENTION

At least one exemplary embodiment is directed to an optical scanning apparatus that can be used in image manipulation devices (e.g., a laser printer, a copier, a facsimile machine, a computer, and other image manipulation devices as known by one of ordinary skill in the relevant arts.

According to at least one exemplary embodiment of the present invention, a pressure gradient in the rotation axis direction of a rotating polygon mirror is reduced. An optical scanning apparatus according to an aspect of the present invention includes a rotating polygon mirror configured to deflect a laser beam to scan, and an air path formation member including a first opening portion and a second opening portion and constituting an air path disposed above the rotating polygon mirror, where the first opening portion is larger than the rotating polygon mirror and is disposed on the lower surface side in a rotation axis direction of the rotating polygon mirror, and the second opening portion is disposed on the upper surface side in the rotation axis direction.

An optical scanning apparatus according to another aspect of the present invention includes a rotating polygon mirror configured to deflect a laser beam to scan, and an air path formation member including a first opening portion and a second opening portion and constituting an air path disposed under the rotating polygon mirror, where the first opening portion is larger than the rotating polygon mirror and is disposed on the upper surface side in a rotation axis direction of the rotating polygon mirror, and the second opening portion is disposed on the side lower than is the rotating polygon mirror in the rotation axis direction.

Further features of the present invention will become apparent from the following description of exemplary embodiments with reference to the attached drawings.

DESCRIPTION OF THE EMBODIMENTS

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the polygon mirrors and the type of sealing material used.

In all of the examples illustrated and discussed herein any specific values, for example gap sizes, circle diameters, the number of sides of a polygon mirror, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting for noise, correcting or a reduction of noise is also intended.

The present invention will be described below in detail with reference to the exemplary embodiments.

First Exemplary Embodiment

The first exemplary embodiment of the present invention will be described below with reference to the examples.

Figure 1:
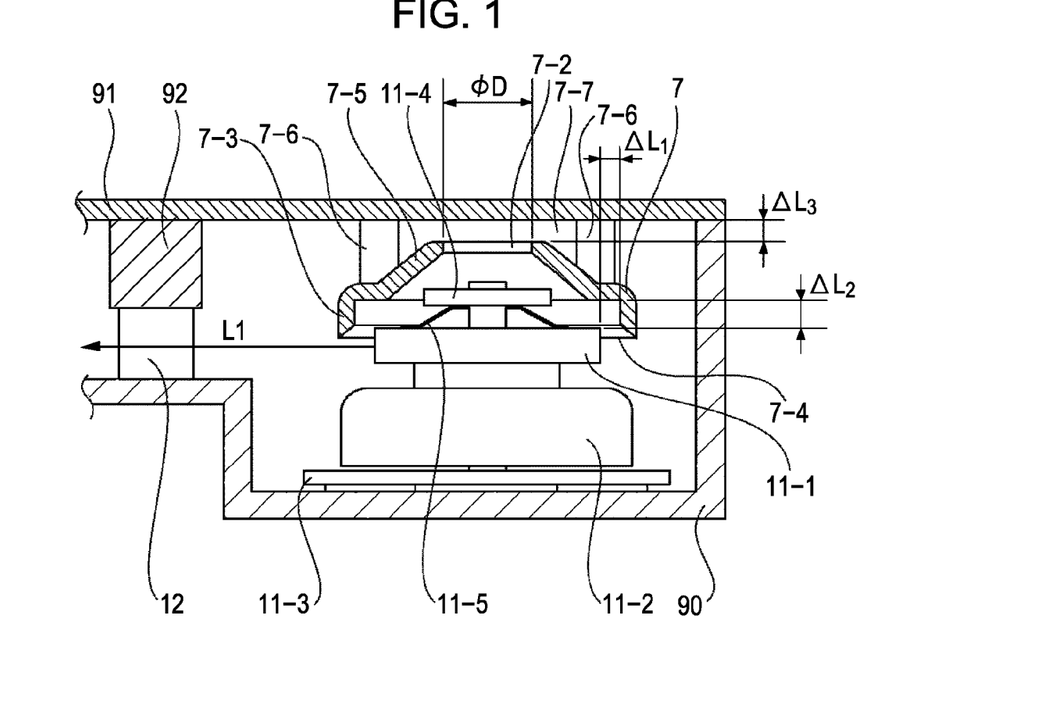
FIG. 1 is a sectional view of a polygon motor portion in a first exemplary embodiment.
Figure 2:
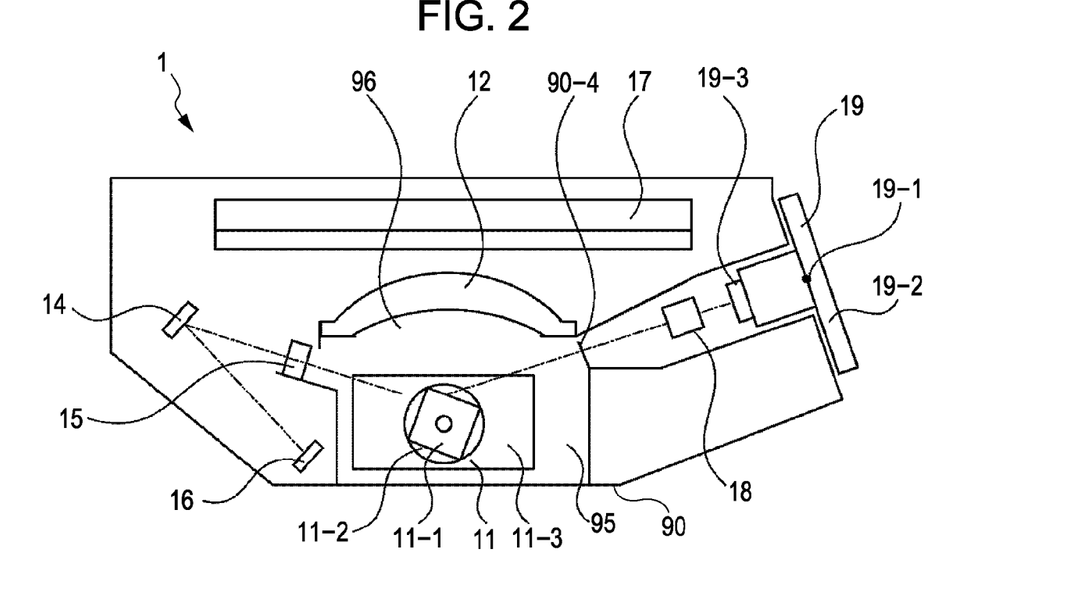
FIG. 2 is a top view of a laser scanning unit in the first exemplary embodiment.
Figure 3:
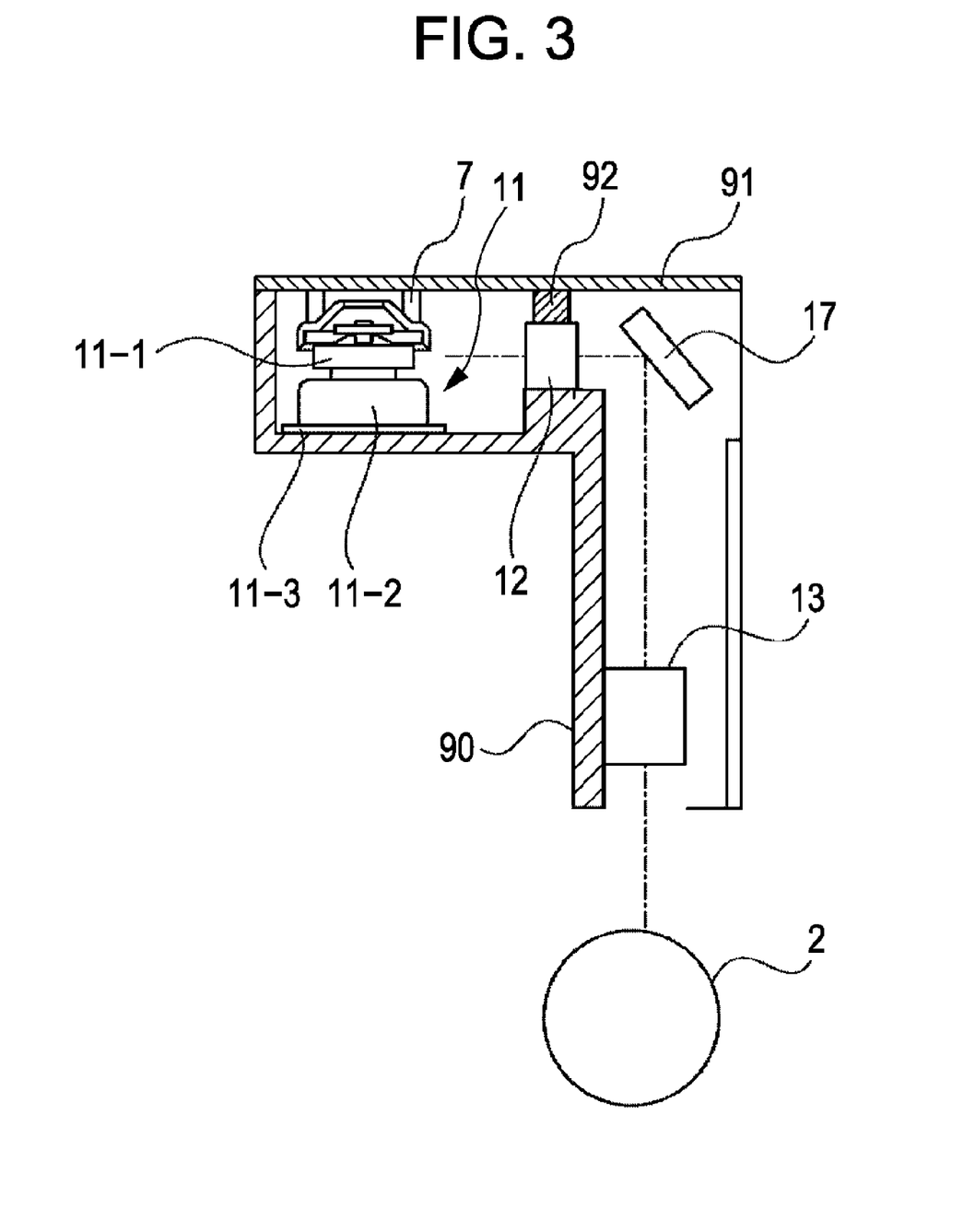
FIG. 3 is a sectional view of the laser scanning unit in the first exemplary embodiment.

FIG. 2 and FIG. 3 are schematic diagrams of a laser scanning unit according to the first exemplary embodiment of the present invention. FIG. 2 is a top view, and FIG. 3 is a sectional view of a unit main body viewed from the front. FIG. 1 is a sectional view showing the periphery of the polygon motor in detail.

The laser scanning unit 1 of the first exemplary embodiment will be described with reference to FIG. 2 and FIG. 3.

In FIG. 2 and FIG. 3, reference numeral 19 denotes a light source unit, which includes a laser light-emitting diode 19-1, a driving electric substrate 19-2 thereof, and a collimator lens body tube 19-3. Reference numeral 18 denotes a cylinder lens, reference numeral 90-4 denotes an aperture diaphragm disposed on a scanner case 90, and reference numeral 11 denotes a polygon motor fixed to the scanner case 90 with screws or other fastening mechanisms and methods (e.g., latches, bonding, and other fastening mechanisms and methods as known by one of ordinary skill in the relevant arts and equivalents). A polygon mirror 11-1 serving as a rotating polygon mirror to allow the laser light to deflect and scan, a brushless motor 11-2, and a substrate 11-3 are included in the configuration. As shown in FIG. 1, the polygon mirror 11-1 is integrated with a rotor of the brushless motor 11-2 by an elastic pressing component 11-5 and a disk-shaped fixing component 11-4. Reference numerals 12 and 13 denote fθ lenses serving as image forming lenses to form an image having a predetermined spot diameter of the laser light on a photosensitive drum, and reference numeral 17 denotes a reflection mirror. As described above, image exposure is performed on an image bearing member, which is the surface to be irradiated, by disposing the optical elements 12, 13, and 17. Reference numeral 16 denotes a beam detector (hereafter referred to as BD) to provide the timing to write the laser light on a line basis on the photosensitive drum 2 serving as the image bearing member. Reference numeral 14 denotes a reflection mirror for the BD, and reference numeral 15 denotes an image forming lens for the BD.

When rotational variation of the polygon mirror occurs, since the writing timing is provided by the BD 16 on a line scanning basis, deviation is relatively small on the image scanning start side in the main scanning direction. However, the image position can fluctuate incorrectly in the scanning direction on the scanning end side in the main scanning direction.

The laser scanning unit 1 is disposed from above on a horizontal surface of the image forming apparatus main body or a slightly inclined stay. Accordingly, a laser light flux path from the light source unit to the reflection mirror including the polygon mirror is disposed horizontally or with a slight inclination. Reference numeral 95 denotes a hermetically sealed space including the polygon motor 11, and is covered with a wall disposed on the scanner case, an upper lid 91, the fθ lens 12, the BD lens 15, and sealing materials 92 formed from closed cell foam type moltopren and disposed filling in the gap between each lens and the upper lid.

The photosensitive drum 2 is scanned with the laser scanning unit 1.

Figure 7A:
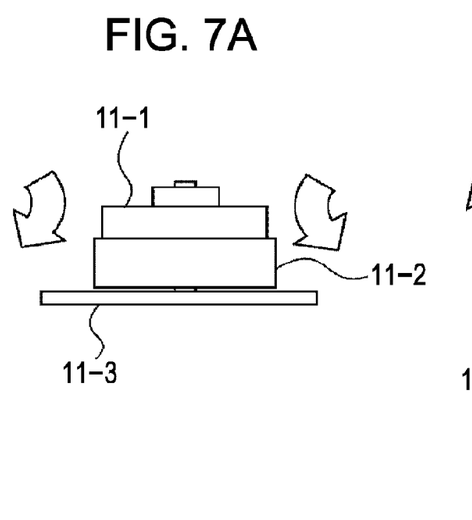
FIGS. 7A and 7B are diagrams showing the macroscopic airflows generated relative to a polygon motor.

The polygon motor 11 of the first exemplary embodiment includes the four-side polygon mirror 11-1 having a circumscribed circle diameter of 25 mm and a rotor portion having an outer diameter of 30 mm of the brushless motor 11-2. Since the outer diameter of the above-described rotor portion is larger than the circumscribed circle diameter of the polygon mirror, the entire airflow generated from the polygon motor 11 becomes as shown in FIG. 7A. That is, in a vertical direction, the airflow tends to be pointed downward. Therefore, in the laser scanning unit 1, the air flows in such a way that the flow in the vertical direction and the flow directed toward the rotational direction of the polygon mirror and diverged toward the outside in the horizontal direction are synthesized.

In FIG. 1, a resin component 7 is an air path formation member disposed between the polygon motor 11 and the upper lid 91. The air path formation member 7 includes a disk-shaped main frame 7-3 and arm portions 7-6 positioned at and fixed to the upper lid 91 serving as a case. In the present exemplary embodiment, this air path formation member serves as a cover component covering a part of the rotating polygon mirror in the rotation axis direction of the rotating polygon mirror. According to this configuration, the pressure gradient of the edge portion of the covered rotating polygon mirror can be stabilized. Even when the cover, which covers the part of the rotating polygon mirror, is not provided, no problem may occur. In the lower portion of this main frame 7-3, an annular wall 7-4 (first opening portion) surrounding the upper portion of the polygon motor 11 is provided, and an inside edge thereof can be provided with a taper divergent downward. The middle portion can be provided with a taper 7-5 following the outside shape of the polygon motor. A circular hole 7-2 (second opening portion) having an inner diameter of D is disposed as the uppermost portion, and a gap 7-7 is disposed in all-around direction between the circular hole 7-2 and the upper lid 91. This circular hole 7-2 is disposed as a surface above the polygon mirror in the rotation axis direction of the polygon mirror. Since the tapered portion divergent downward is provided, generation of a turbulent flow due to an airflow in the vertical direction can be reduced.

Furthermore, casing members 90 and 91 are provided to bring the space including the polygon motor into a substantially hermetically sealed state. Therefore, the fouling and noise of the polygon mirror can be reduced by disposing the air path formation member inside the case.

Figure 8:
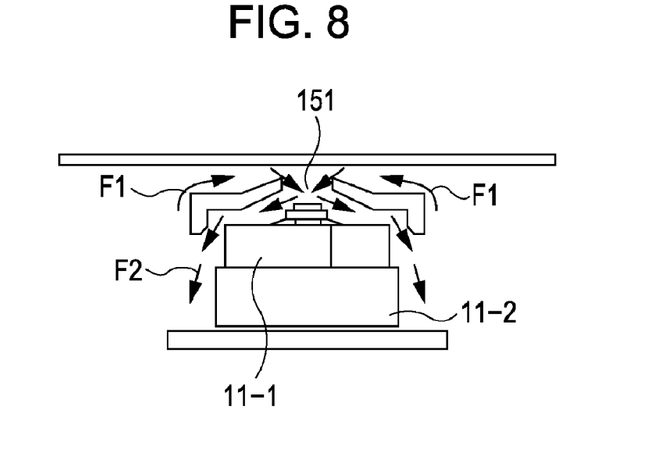
FIG. 8 is a diagram showing the airflows generated relative to the polygon motor in the first exemplary embodiment.

As indicated by a schematic diagram shown in FIG. 8, airflows generated around the polygon motor due to component 7 include an airflow F2 flowing downward and an airflow F1 flowing toward the component 7. As a result, simply a slight negative pressure is applied to an upper surface portion 151 of the polygon mirror 11-1, and the pressure variation against the polygon mirror surface (upper surface in the rotation axis direction) becomes small. Consequently, highly accurate rotation of the polygon mirror can be attained. In the present exemplary embodiment, the airflows F1 and F2 are circulated by component 7. Furthermore, the taper 7-5 and the taper of the annular wall exert an effect that the airflow in the vertical direction, between the component 7 and the polygon motor, flows more smoothly.

Figure 4:
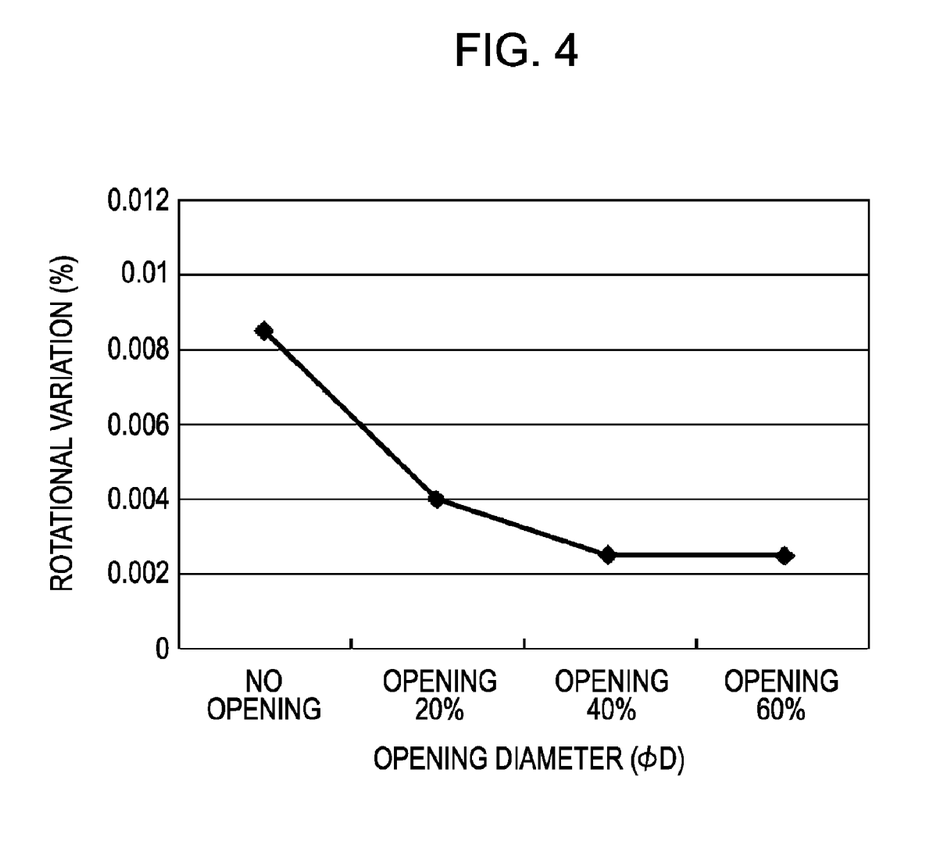
FIG. 4 is a graph showing data in the first exemplary embodiment.

With respect to the opening diameter D of the upper circular opening portion 7-2 of the above-described air path formation member 7, the pressure gradient of the polygon mirror upper surface portion is reduced simply by creation of the hole, thus the rotational variation of the polygon motor is improved. As shown in FIG. 4, the rotational variation of the polygon motor tends to be improved by increasing the opening diameter D. When the ratio of the opening diameter D to the circumscribed circle diameter of the polygon mirror is specified to be 20% or more, the rotational variation becomes 0.004% or less, and the possibility of obvious color misalignment decreases. That is, the airflow can be made uniform in the circumferential direction, and the negative pressure generated at the portion above the polygon mirror can be improved satisfactorily. This relationship is widely compatible with the size and the rotation speed of the polygon mirror. However, if the above-described ratio exceeds 100%, the following problem can occur. An effect of guiding an airflow directing from the upper surface portion of the polygon mirror toward the outside is impaired. Therefore, it is effective that the ratio of the opening diameter D of the upper circular opening portion 7-2 to the polygon mirror circumscribed circle diameter is 20% to 100%.

The rotational variation of the polygon motor is determined by dividing the P-P value of the amount of variations of the rotation speed by the rotation speed. A P-P value refers to a difference between a maximum rotation speed and a minimum rotation speed. In the measurement, the BD output signal of the light beam scanning unit is input into a time interval counter on the number of reflection surfaces of the polygon mirror basis, and the rotational variation is determined from the signal interval. With respect to the image standard on the rotational variation, in the case where the rotational variation of the polygon mirror is 0.004% or less, a positional deviation in the scanning direction from BD 16, which is out of the image region and provides timing, to the scanning end side becomes 15 μm or less. Furthermore, a region can be selected from the regions indicated by an opening of 40% or more, in which a substantially lower limit value is reached and no change is observed in the relationship between the opening diameter and the rotational variation. When the opening is 40% or more, the positional deviation in the scanning direction from BD 16, which is out of the image region and provides timing, to the scanning end side can be controlled at a smaller value. As a result, since the color misalignment does not become obvious in the image, similar relationships can be attained in a laser scanning unit capable of scanning longitudinal widths of almost all A4-sizes.

The distance between the annular wall of 7-3 and the light beam L1 typically can be outside the range of shielding the light beam, and the smaller the distance is, without shielding the light beam L1, the more useful the annular wall is in guiding the airflow in the vertical direction.

In the present exemplary embodiment, a gap $\Delta L_3$ between the circular hole 7-2 and the upper lid 91 in the gap 7-7 is 3 mm. However, a gap $\Delta L_3$ of 1 mm or less functions satisfactorily, as long as it does not become resistance to the airflow.

When gaps $\Delta L_1$ and $\Delta L_2$ between the air path formation member and the polygon mirror are within the range of 2 to 6 mm, generation of a turbulent flow is reduced, and a noise reduction occurs.

In the present exemplary embodiment, the configuration includes the circular opening portion and the circular wall. However, polygonal shapes can be included in place of the circular shape.

Figure 9:
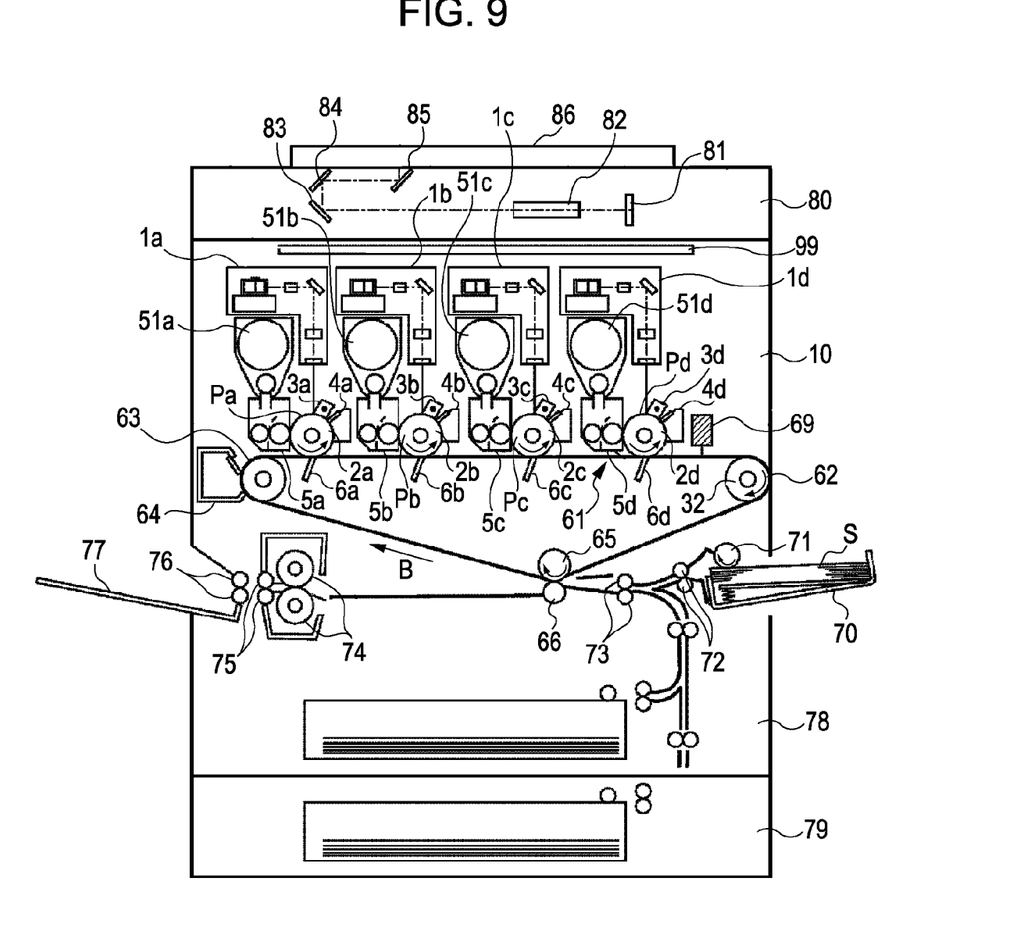
FIG. 9 is a schematic diagram of an image forming apparatus.

Up to this point, the laser scanning unit according to the first exemplary embodiment has been described. FIG. 9 illustrates the use of laser scanning unit of the first exemplary embodiment in a digital full color copier. A copying operation of the digital full color copier will be described below with reference to FIG. 9. In the drawing, reference numeral 80 denotes a document reading portion, reference numeral 10 denotes a full color image forming portion. Four image stations are disposed in the full color image forming portion 10, and individual image forming stations have their respective photosensitive drums 2a, 2b, 2c, and 2d as image bearing members.

Charging means 3a, 3b, 3c, and 3d exclusive to the photosensitive drums and laser scanning units 1a, 1b, 1c, and 1d are disposed around them. Development devices 5a, 5b, 5c, and 5d are disposed to develop formed electrostatic latent images. Drum cleaning devices 4a, 4b, 4c, and 4d are disposed to remove toner remaining on the photosensitive drums after transfer. Respective transfer devices 6a, 6b, 6c, and 6d are disposed to transfer toner images on the photosensitive drums to intermediate transfer materials or recording materials. Reference numerals 51a to 51d denote developer containers in one-to-one relationship with the development devices 5a, 5b, 5c, and 5d, and the containers are disposed immediately below horizontal portions of the laser scanning units 1a, 1b, 1c, and 1d and beside vertical portions. The developer is replenished by attaching and detaching a cylindrical developer cartridge. Here, the image forming stations Pa, Pb, Pc, and Pd are places at which a cyan image, a magenta image, a yellow image, and a black image, respectively, are formed.

On the other hand, an endless belt-shaped intermediate transfer belt 61 is disposed under the photosensitive drums 2a, 2b, 2c, and 2d in such a way as to pass through the individual image forming stations Pa to Pd. The intermediate transfer belt 61 is looped over a driving roller 62 and driven rollers 63 and 65, and is provided with a cleaning device 64 to clean the surface of the belt.

In the above-described configuration, an electrostatic latent image is formed on the photosensitive drum 2a through exposure by using the charging means 3a of the first image forming station Pa and the laser scanning unit 1a. The electrostatic latent image is converted to a visible image as a cyan toner image by the developer containing cyan toner with the development device 5a, and the cyan toner image is transferred with the transfer device 6a to the surface of the intermediate transfer belt 61.

On the other hand, in the second image forming station Pb, likewise, a magenta toner image is formed, while the above-described cyan toner image is transferred to the surface of the intermediate transfer belt 61. Thereafter, the magenta toner image is precisely transferred to and superimposed on the intermediate transfer belt 61, to which the transfer has been completed in the above-described first image forming station Pa, with the transfer device 6b.

Subsequently, image formation of a yellow image and a black image is performed in a manner similar to that described above, and toner images of the four colors are superimposed on the intermediate transfer belt 61. The four-color toner image on the intermediate transfer belt is transferred (secondary transfer) with a secondary transfer roller 66 to a recording material S fed from a paper feed cassette 70 with a paper feed roller 71, a feed roller pair 72, and a resist roller pair 73 while timing is provided. After the secondary transfer to the recording material S is completed, the transferred toner image is heated and fixed with a fixing roller pair 74, so that a full color image on the recording material S is produced.

After the transfer is completed, toner remaining on the individual photosensitive drums 2a to 2d is removed with the cleaning devices 4a to 4d, so that the photosensitive drums 2a to 2d are prepared for a following image formation.

Second Exemplary Embodiment

The second exemplary embodiment of the present invention will be described.

Figure 5A:
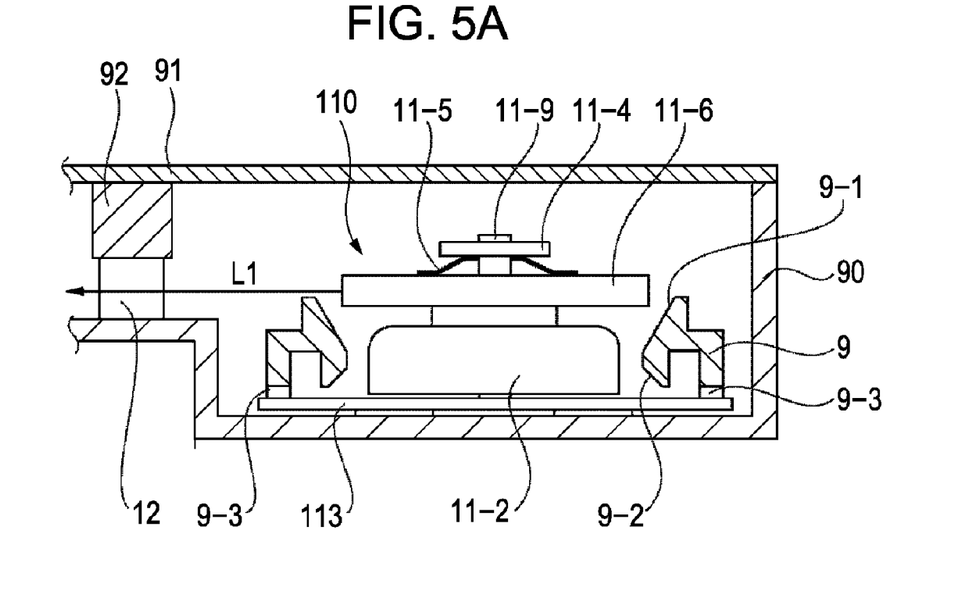
FIGS. 5A and 5B are diagrams showing a polygon motor portion in a second exemplary embodiment.
Figure 5B:
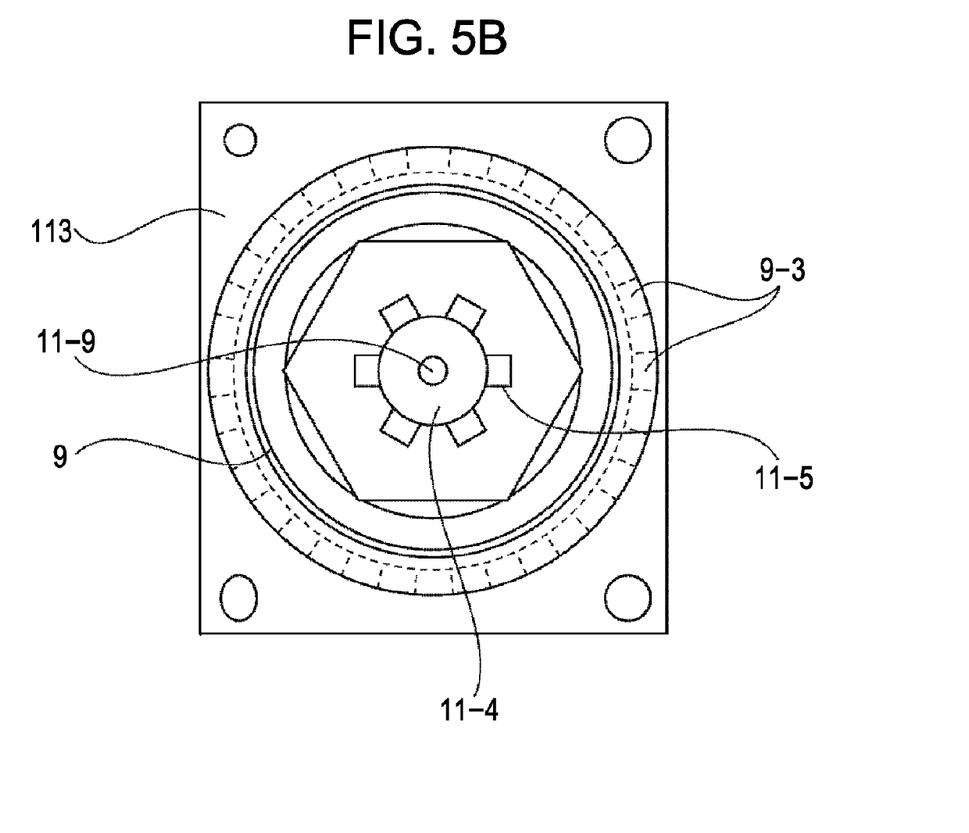

FIGS. 5A and 5B are schematic diagrams showing the second exemplary embodiment. FIG. 5A is a sectional view, and FIG. 5B is a top view of a polygon motor.

The second exemplary embodiment includes a polygon motor 110 in which a six-side polygon mirror 11-6 having a circumscribed circle diameter of 50 mm is attached to a brushless motor 11-2 similar to that in the first exemplary embodiment. A cylindrical component 9 serving as an air path formation member having top and bottom circular openings is disposed on a substrate 113 of the polygon motor. The polygon mirror side, that is, the upper surface side in the rotation axis direction, of this cylindrical component is opened (first opening portion). A plurality of opening portions (second opening portions) are disposed on the side lower than is the polygon mirror in the rotation axis direction. The opening in the lower surface in the rotation axis direction is blocked because a cover component is attached to the substrate 113 of the polygon motor. In the present exemplary embodiment, this cylindrical component serves as a cover component covering a part of the rotating polygon mirror in the rotation axis direction of the rotating polygon mirror. According to this configuration, the pressure gradient of an edge portion of the rotating polygon mirror covered can be stabilized. No problem may occur, even when the cover, which covers the part of the rotating polygon mirror, is not provided. The plurality of opening portions will be described. A plurality of ribs serving as supports to support the cover are disposed on the substrate 113, and the opening portions are formed between individual ribs. In the present exemplary embodiment, a plurality of ribs are disposed and, in addition, a plurality of openings 9-3 are also disposed.

When a cover is disposed on the side of a motor to drive the rotating polygon mirror, openings are disposed in the side surface on the side lower than the rotating polygon mirror in the rotation axis direction.

Figure 7B:
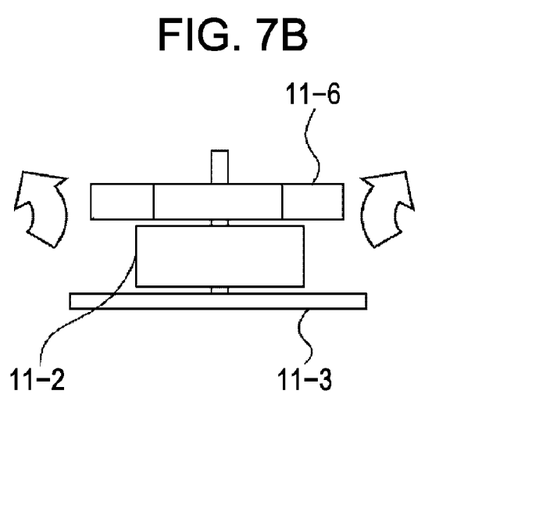

In the second exemplary embodiment, since the circumscribed circle diameter of the polygon mirror is larger than the outer diameter of the rotor, the airflow of the entire polygon motor flows from bottom in an upward direction, as shown in FIG. 7B.

Consequently, a cylindrical wall 9-1 which can have a taper, the inside of which can be divergent upward following the outside shape of the polygon motor, can be disposed all around the cylindrical component 9 in such a way as to cover the undersurface of the polygon mirror. A taper 9-2 can also be disposed on the inner side of the lower opening, and a plurality of holes 9-3 can be disposed between the substrate 113 and the cylindrical component 9 in a radius direction at a regular pitch in a circumferential direction. The plurality of holes can be disposed in the circumferential direction, facilitating a uniform pressure in the cover. According to this configuration, the above-described airflow can be guided from bottom to top with little interference, and an occurrence of pressure gradient in the vertical direction can be reduced.

Third Exemplary Embodiment

The third exemplary embodiment of the present invention will be described below with reference to the examples.

Figure 6A:
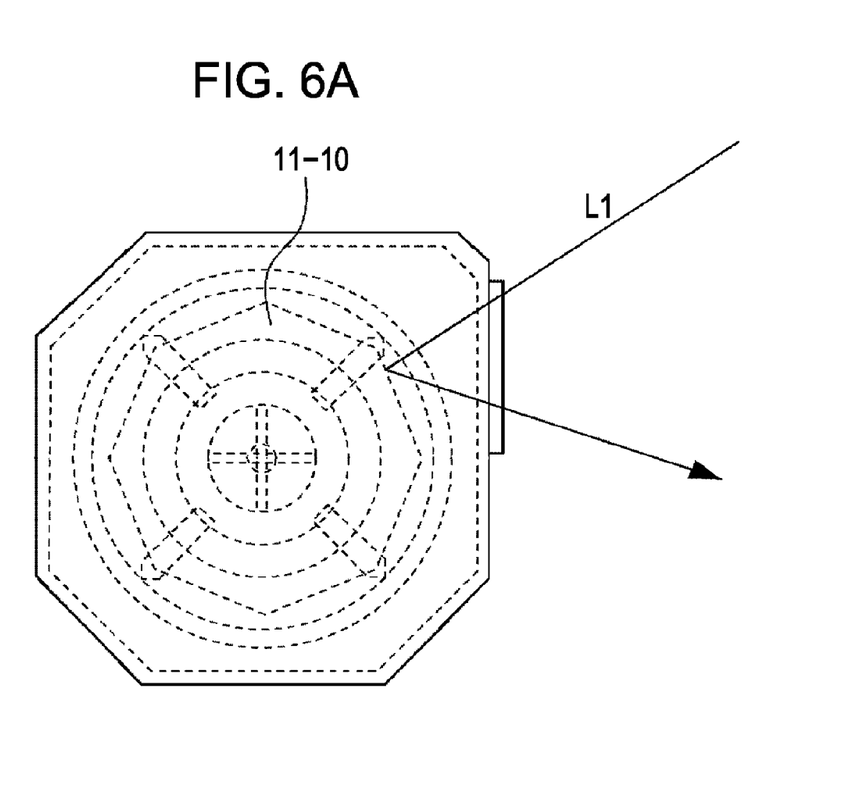
FIGS. 6A and 6B are diagrams showing a polygon motor portion in a third exemplary embodiment.
Figure 6B:
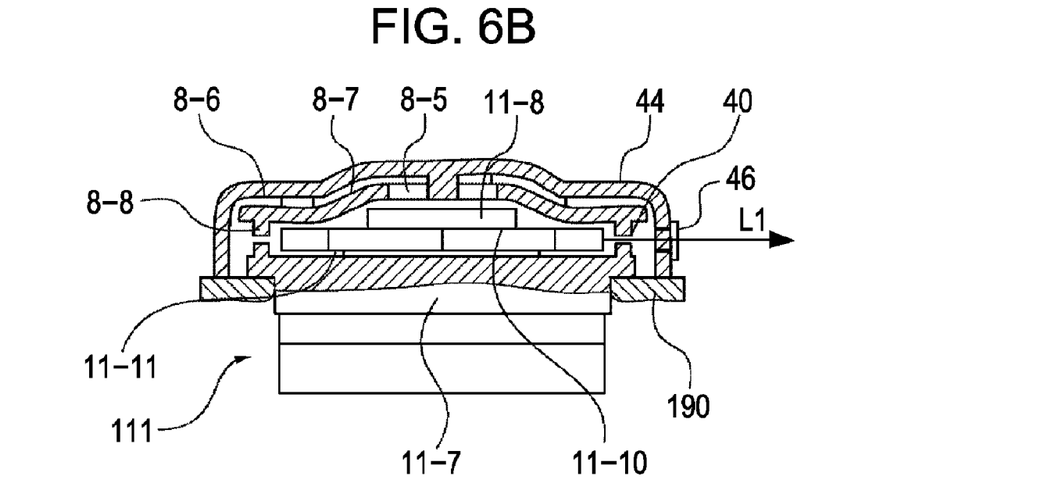

FIGS. 6A and 6B are schematic diagrams showing the third exemplary embodiment. FIG. 6A is a top view, and FIG. 6B is a sectional view.

In the third exemplary embodiment, a cover 44 is disposed so as to hermetically seal a portion above a polygon motor 111 with a case 11-7 of the polygon motor and a case 190. Window glass 46 is adhered around the perimeter of the outer wall of the cover 44 without gap, so that the light beam L1 is transmitted, but exchange of air between the inside and the outside of the cover is prevented. An air guide provided with an annular (ring-shaped) slit 40 can be formed by a cylindrical wall disposed on each of the cover 44 and the case 11-7 on the outer perimeter side of a polygon mirror 11-10. A circular air vent 8-5 is disposed in a portion, which faces the upper surface of the polygon mirror, of the cover 44. The air vent 8-5 and the outside of the air guide are connected with a vent space 8-6 disposed almost all around.

When the polygon mirror is rotated, an airflow from the center in an outward direction is generated on the upper surface portion of the polygon mirror. Consequently, air flows through the vent devices 8-5 and 8-6 disposed in the cover 44, and the pressure gradient can be reduced, in which the upper surface of the polygon mirror 11-10 becomes a lower negative relative pressure compared to the pressure at the middle polygon mirror surface.

Other Exemplary Embodiments

In the above-described exemplary embodiments, full color image output apparatuses are simply explained. However, the present invention is not limited to them. Two or more exemplary embodiments can be combined.

As described above, according to at least one exemplary embodiment of the present invention, the airflow in the vertical direction can be intentionally formed in order to reduce the pressure gradient in the rotation axis direction of the rotating polygon mirror.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-265528 filed Sep. 13, 2005, which is hereby incorporated by reference herein in its entirety.

What is claimed is:

1. An optical scanning apparatus comprising:
a rotating polygon mirror configured to deflect a laser beam by reflective mirrors;
a motor for driving said rotating polygon mirror; and
a cover having a first opening portion and a second opening portion, wherein said second opening portion is disposed such that the rotation axis of said rotating polygon mirror extends through said second opening portion,
wherein the entire cover and the motor are disposed on sides opposed to each other in relation to a plane which is perpendicular to the rotation axis of said rotating polygon mirror and which passes through said rotating polygon mirror, and wherein the cover is disposed such that a path for an airflow is formed between said first opening portion and said second opening portion and said first opening portion and said second opening portion are disposed on the same side in relation to the plane.

2. The optical scanning apparatus according to claim 1, wherein a cross section of said cover, in a direction perpendicular to the direction of the rotation axis of said rotating polygon mirror, is annular in shape.

3. The optical scanning apparatus according to claim 1, wherein a part of said cover is disposed to face a part of a reflective surface of said rotating polygon mirror without shielding the laser beam.

4. The optical scanning apparatus according to claim 1, wherein said second opening portion is circular, and a ratio of an opening diameter of said second opening portion to a circumscribed circle diameter of said rotating polygon mirror is 20% to 100%.

5. The optical scanning apparatus according to claim 1, wherein said first opening portion is circular, viewed from the direction of the rotation axis of the polygon mirror, and an inner diameter of said first opening portion is larger than a diameter of a circumscribed circle of said polygon mirror.

6. The optical scanning apparatus according to claim 1, wherein said cover tapers from said first opening portion to said second opening portion.

7. An optical scanning apparatus comprising:
a rotating polygon mirror including a plurality of reflection surfaces for deflecting a light beam emitted from a light source; and
a cover configured to cover the rotating polygon mirror,
wherein the cover includes a first opening portion for simultaneously exposing at least a part of each reflection surface of all of the plurality of reflection surfaces in an entire circumference in a rotation direction of the rotating polygon mirror, a second opening portion disposed such that the rotation axis of the rotating polygon mirror extends through the second opening portion, and a frame, between the first opening portion and the second opening portion, in which an air gap is provided for connecting the first opening portion and the second opening portion and forming an air path between the rotating polygon mirror and the frame.

8. The optical scanning apparatus according to claim 7, wherein the second opening portion is circular, and a ratio of an opening diameter of the second opening portion to a circumscribed circle diameter of the rotating polygon mirror is 20% to 100%.

9. The optical scanning apparatus according to claim 7, wherein an edge of the frame that forms the first opening portion is annular along the rotation direction of the rotating polygon mirror.

10. The optical scanning apparatus according to claim 7, further comprising:
a driving motor disposed on a side different from the cover in relation to the rotating polygon mirror in a rotation axis direction of the rotating polygon mirror and configured to rotate the rotating polygon mirror,
wherein a taper is formed inside the edge of the frame that forms the first opening portion so that the first opening portion widens toward the driving motor.

11. The optical scanning apparatus according to claim 7, further comprising:
a case in which the rotating polygon mirror is disposed,
wherein the frame is disposed in the case such that a space for circulating air between the case and the frame is formed.

12. An optical scanning apparatus comprising:
a rotating polygon mirror including a plurality of reflection surfaces for deflecting a light beam emitted from a light source;
a driving motor configured to rotate the rotating polygon mirror;
a case in which the rotating polygon mirror and the driving motor are disposed; and
a frame disposed in the case such that the frame simultaneously does not shield at least a part of each reflection surface of all of the plurality of reflection surfaces in an entire circumference along a rotation direction of the rotating polygon mirror and such that a first opening is formed between the frame and the rotating polygon mirror and a second opening is provided such that the rotation axis of the rotating polygon mirror extends through the second opening,
wherein the frame and the rotating polygon mirror form an air path so that air flows from the second opening to the first opening.

13. The optical scanning apparatus according to claim 12, wherein the second opening is circular, and a ratio of a diameter of the second opening to a circumscribed circle diameter of the rotating polygon mirror is 20% to 100%.

14. The optical scanning apparatus according to claim 12, wherein an edge of a frame that forms the first opening is annular along a rotation direction of the rotating polygon mirror.

15. The optical scanning apparatus according to claim 12, wherein the driving motor is disposed on a side different from the cover in relation to the rotating polygon mirror in a rotation axis direction of the rotating polygon mirror, and a taper is formed inside the edge of the frame that forms the first opening so that the first opening widens toward the driving motor.

16. The optical scanning apparatus according to claim 12, wherein the frame is disposed in the case such that a space for circulating air between the case and the frame is formed.

* * * * *